United States Patent
Corbett

(10) Patent No.: US 10,260,227 B2
(45) Date of Patent: Apr. 16, 2019

(54) TUBULAR FRAMING SYSTEM AND METHOD

(71) Applicant: Adrian Corbett, San Diego, CA (US)

(72) Inventor: Adrian Corbett, San Diego, CA (US)

(73) Assignee: ROCK WEST COMPOSITES, INC., San Diego, CA (US)

( * ) Notice: Subject to any disclaimer, the term of this patent is extended or adjusted under 35 U.S.C. 154(b) by 0 days.

(21) Appl. No.: 15/178,416

(22) Filed: Jun. 9, 2016

(65) Prior Publication Data
US 2017/0356178 A1 Dec. 14, 2017

Related U.S. Application Data

(60) Provisional application No. 62/173,306, filed on Jun. 9, 2015.

(51) Int. Cl.
*E04B 1/34* (2006.01)
*A47B 47/00* (2006.01)
(Continued)

(52) U.S. Cl.
CPC ...... *E04B 1/34315* (2013.01); *A47B 47/0008* (2013.01); *A47B 47/0016* (2013.01); *F16B 7/0446* (2013.01)

(58) Field of Classification Search
CPC ............ Y10T 403/39; Y10T 403/3906; Y10T 403/73; Y10T 403/4602; Y10T 403/4697; Y10T 403/34; Y10T 403/341; E04H 1/12; E04H 1/005; E04B 1/34315; E04B 2/00; E04B 7/20; E04B 1/34321; E04B 1/34384; E04B 1/34336; E04B 2001/2478; A47B 47/005; A47B 47/0041; A47B 47/0033; A47B 47/0025; A47B 47/0016; A47B 47/0008; A47B 47/00; F16B 7/0446; F16B 7/046; F16B 7/048; F16B 7/0486; F16B 7/0493; F16B 7/187; F16B 7/22
USPC ..... 52/641, 646, 648.1, 649.2, 649.3, 653.1, 52/653.2, 79.1, 261, 262, 272, 274, 282.2, 52/698, 831, 834, 835, 838, 839, 843, 52/845, 848, 79.5, 79.11, 79.12, 90.1,
(Continued)

(56) References Cited

U.S. PATENT DOCUMENTS 553,525 A * 1/1896 Hankin ................. F16B 7/0446
403/344
2,926,941 A * 3/1960 Thompson ......... A47B 47/0008
403/173
(Continued)

*Primary Examiner* — Ryan D Kwiecinski
(74) *Attorney, Agent, or Firm* — Steins & Associates, P.C.

(57) ABSTRACT

A Tubular Framing System and Method. The system and method enables users to create structures from tube stock, such as carbon fiber or other composites without the need for a specialized workspace or customized tooling. The system allows the user to create joints, attachment points and mounting points for tubular and sheet composite material. When assembled, the joints between tubular segments and the attached termination fittings provide unparalleled tensile strength without the need for adhesives or special testing for verification. The system includes base assemblies, mid-span bracket and mounting assemblies and a wide range of versatile connectors that can provide the user with the flexibility to easily and rapidly create a wide variety of structures from strong and lightweight composite tube stock and aircraft-grade aluminum connectors.

14 Claims, 16 Drawing Sheets

(51) Int. Cl.
*F16B 7/04* (2006.01)
*E04B 1/343* (2006.01)

(58) Field of Classification Search
USPC ............. 52/143, 293.3, 294, 295, 296, 299;
211/182; 248/574, 346.01; 108/180,
108/186, 187, 155; 312/265.1–265.4;
403/96, 97, 176, 91, 92, 44, 100, 101,
403/170–172, 217
See application file for complete search history.

(56) References Cited

U.S. PATENT DOCUMENTS

| | | | | | |
|---|---|---|---|---|---|
| 3,263,692 | A * | 8/1966 | Questi | .................... | E04H 15/44 135/118 |
| 3,513,610 | A * | 5/1970 | Devonport | .............. | B28B 23/00 52/283 |
| 3,787,134 | A * | 1/1974 | Burr | ..................... | F16B 7/0446 403/217 |
| 4,045,104 | A * | 8/1977 | Peterson | ................. | A47B 47/03 211/182 |
| 4,093,167 | A * | 6/1978 | Rooklyn | .............. | A47B 13/021 108/158.11 |
| 4,116,573 | A * | 9/1978 | Fuchs | ................... | F16B 5/0607 403/187 |
| 4,124,317 | A * | 11/1978 | Dauth | .................... | F16B 7/0453 403/254 |
| 4,235,559 | A * | 11/1980 | Rooklyn | ................. | F16B 12/30 403/171 |
| 4,505,609 | A * | 3/1985 | Vella | ....................... | E04H 15/18 403/170 |
| 4,630,550 | A * | 12/1986 | Weitzman | .............. | A47B 13/06 108/155 |
| 4,766,712 | A * | 8/1988 | Hale | ...................... | E04B 1/1903 403/171 |
| 4,900,184 | A * | 2/1990 | Cleveland | ............... | E04C 5/168 24/339 |
| 4,923,322 | A * | 5/1990 | Burg | ..................... | F16B 7/0446 211/191 |
| 5,046,882 | A * | 9/1991 | Ju | ........................ | E04H 15/40 135/135 |
| 5,353,892 | A * | 10/1994 | Lu | ............................. | E06C 1/32 16/328 |
| 5,383,723 | A * | 1/1995 | Meyer | .................... | A47B 55/00 312/265.4 |
| 5,457,929 | A * | 10/1995 | Kim | .......................... | E04C 3/34 52/244 |
| 5,481,842 | A * | 1/1996 | Gautreau | ................... | E04B 2/76 403/231 |
| 5,536,097 | A * | 7/1996 | Hazan | ................ | A47B 47/0016 29/525.02 |
| 5,556,218 | A * | 9/1996 | Homer | ................... | E04B 1/5831 403/170 |
| 5,620,272 | A * | 4/1997 | Sheng | .................. | E05D 11/1007 182/163 |
| 5,640,811 | A * | 6/1997 | Boyle | ..................... | E04H 4/108 135/142 |
| 5,661,942 | A * | 9/1997 | Palmer | .................. | E04H 15/48 135/156 |
| 5,888,015 | A * | 3/1999 | Brown | ................... | F16B 7/1454 403/374.1 |
| 6,219,989 | B1 * | 4/2001 | Tumura | ................ | E04B 1/2403 52/274 |
| 6,247,869 | B1 * | 6/2001 | Lichvar | ................... | F16L 47/00 285/179.1 |
| 6,277,069 | B1 * | 8/2001 | Gray | ....................... | A61B 17/02 403/391 |
| 6,447,201 | B1 * | 9/2002 | McCracken | ............ | E04G 11/48 403/374.2 |
| 6,503,020 | B1 * | 1/2003 | Mascioletti | ........... | E04B 1/2604 403/231 |
| 7,682,099 | B2 * | 3/2010 | Cole | ........................ | B25F 1/04 192/69.91 |
| 8,511,033 | B2 * | 8/2013 | Kumakawa | ............... | E04B 1/48 403/230 |
| 9,126,613 | B2 * | 9/2015 | Savage | .................. | B62B 3/108 |
| 9,458,874 | B2 * | 10/2016 | Sim | ....................... | E04B 1/5831 |
| D805,883 | S * | 12/2017 | Evitt | ........................... | D8/382 |
| D805,884 | S * | 12/2017 | Evitt | ........................... | D8/382 |
| 9,868,008 | B2 * | 1/2018 | Todokoro | ................. | A63B 9/00 |
| 9,993,677 | B2 * | 6/2018 | Todokoro | ................. | A63B 7/00 |
| 2002/0090256 | A1 * | 7/2002 | Chin | ...................... | A47B 13/06 403/175 |
| 2004/0226249 | A1 * | 11/2004 | Wang | ................... | A47B 47/005 52/633 |
| 2005/0008430 | A1 * | 1/2005 | Kahl | ....................... | F16B 7/18 403/231 |
| 2005/0036829 | A1 * | 2/2005 | Trull | ....................... | A01G 9/16 403/170 |
| 2005/0265778 | A1 * | 12/2005 | Tzeng | .................... | F16B 12/52 403/231 |
| 2006/0138066 | A1 * | 6/2006 | Hung | ................... | A47B 47/005 211/189 |
| 2007/0209314 | A1 * | 9/2007 | Vaughn | .................. | E02D 27/34 52/838 |
| 2007/0245677 | A1 * | 10/2007 | Nguyen | .................. | E04B 1/2403 52/698 |
| 2007/0261356 | A1 * | 11/2007 | Vaughn | .................. | E02D 27/34 52/655.1 |
| 2009/0194991 | A1 * | 8/2009 | Yang | ................... | A47B 47/0008 285/31 |
| 2011/0036798 | A1 * | 2/2011 | Chen | ................... | A47B 47/0008 211/188 |
| 2011/0194892 | A1 * | 8/2011 | Huang | ............... | A47B 47/0016 403/296 |
| 2012/0009013 | A1 * | 1/2012 | Evitt | ..................... | A47B 47/005 403/349 |
| 2012/0013236 | A1 * | 1/2012 | Fan | ....................... | H05K 7/1488 312/351.1 |
| 2012/0301215 | A1 * | 11/2012 | Huang | ............... | A47B 47/0016 403/176 |
| 2013/0036702 | A1 * | 2/2013 | Pacetti | ..................... | E04H 1/1205 52/653.2 |
| 2013/0156495 | A1 * | 6/2013 | Li | .......................... | F41G 11/003 403/322.4 |
| 2013/0294817 | A1 * | 11/2013 | Augustsson | ............ | F16B 7/185 403/217 |
| 2013/0306808 | A1 * | 11/2013 | Huang | .................... | A47B 13/06 248/163.1 |
| 2014/0294500 | A1 * | 10/2014 | Schaaf | .................. | F16B 7/0446 403/403 |
| 2015/0167713 | A1 * | 6/2015 | Schaerer | ................. | F16B 7/185 403/171 |
| 2015/0267735 | A1 * | 9/2015 | Bacon | ................... | F16B 37/045 403/298 |
| 2015/0377414 | A1 * | 12/2015 | Pirseyedi | ........... | A47B 47/0016 403/205 |
| 2016/0250509 | A1 * | 9/2016 | Todokoro | ................. | A63B 9/00 403/53 |
| 2016/0363153 | A1 * | 12/2016 | Lakoduk | ................. | F16B 35/00 |
| 2017/0020282 | A1 * | 1/2017 | Bensen | ............... | A47B 47/0016 |
| 2017/0030390 | A1 * | 2/2017 | Su | ........................ | F16B 7/0413 |
| 2017/0145708 | A1 * | 5/2017 | Chen | ....................... | E04H 1/12 |
| 2017/0233995 | A1 * | 8/2017 | Abernathy | ............. | F16B 7/182 52/845 |
| 2017/0233996 | A1 * | 8/2017 | Abernathy | ............ | E04B 1/2403 52/698 |
| 2017/0261022 | A1 * | 9/2017 | Schirmer | ................. | F16B 12/40 |
| 2017/0295956 | A1 * | 10/2017 | Lin | ..................... | A47B 47/0008 |
| 2017/0356178 | A1 * | 12/2017 | Corbett | ................. | E04B 1/34315 |
| 2018/0058625 | A1 * | 3/2018 | McPhillips | ............ | F16M 11/24 |
| 2018/0064245 | A1 * | 3/2018 | Huang | .................. | F16B 5/0642 |
| 2018/0066688 | A1 * | 3/2018 | Koepke | ................. | F16B 7/0413 |
| 2018/0251265 | A1 * | 9/2018 | Egertz | ................ | A47B 47/0016 |

* cited by examiner

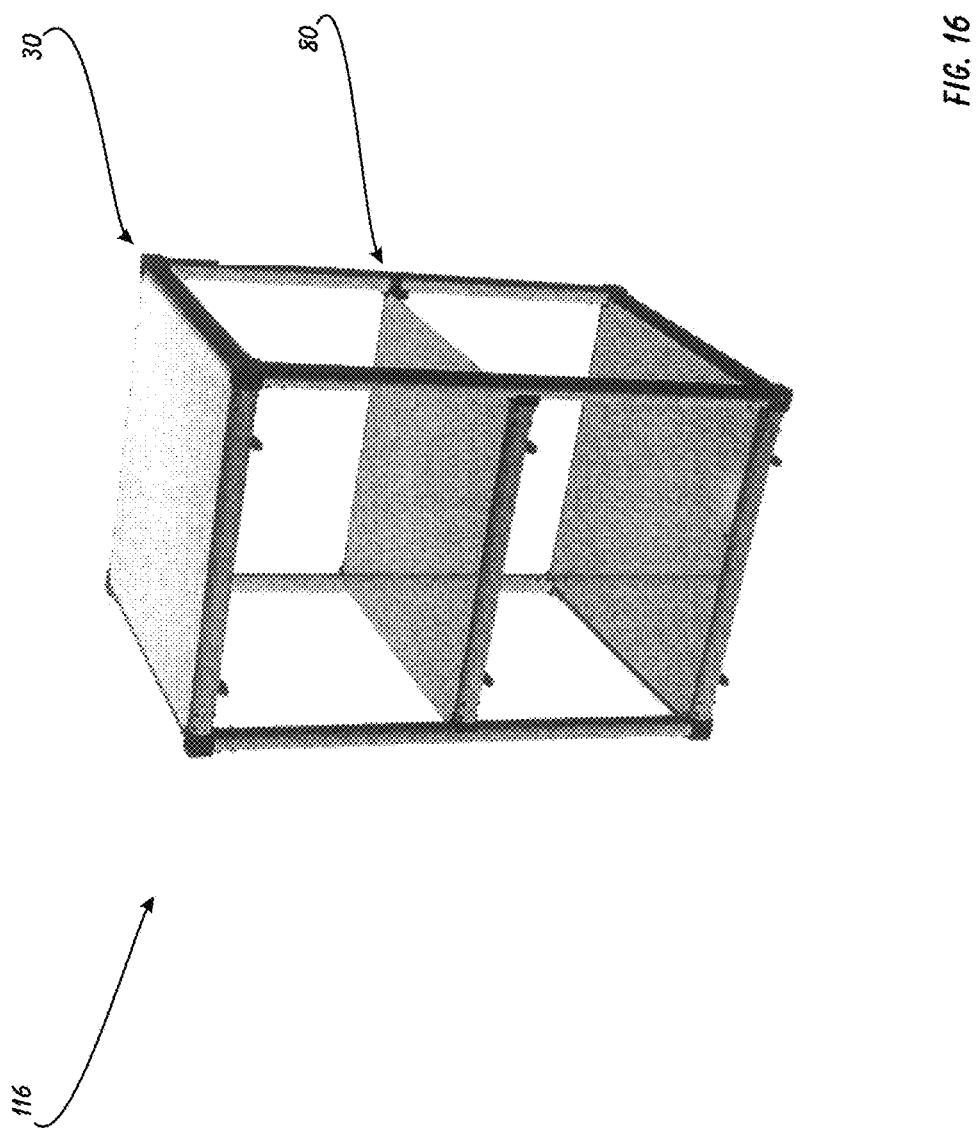

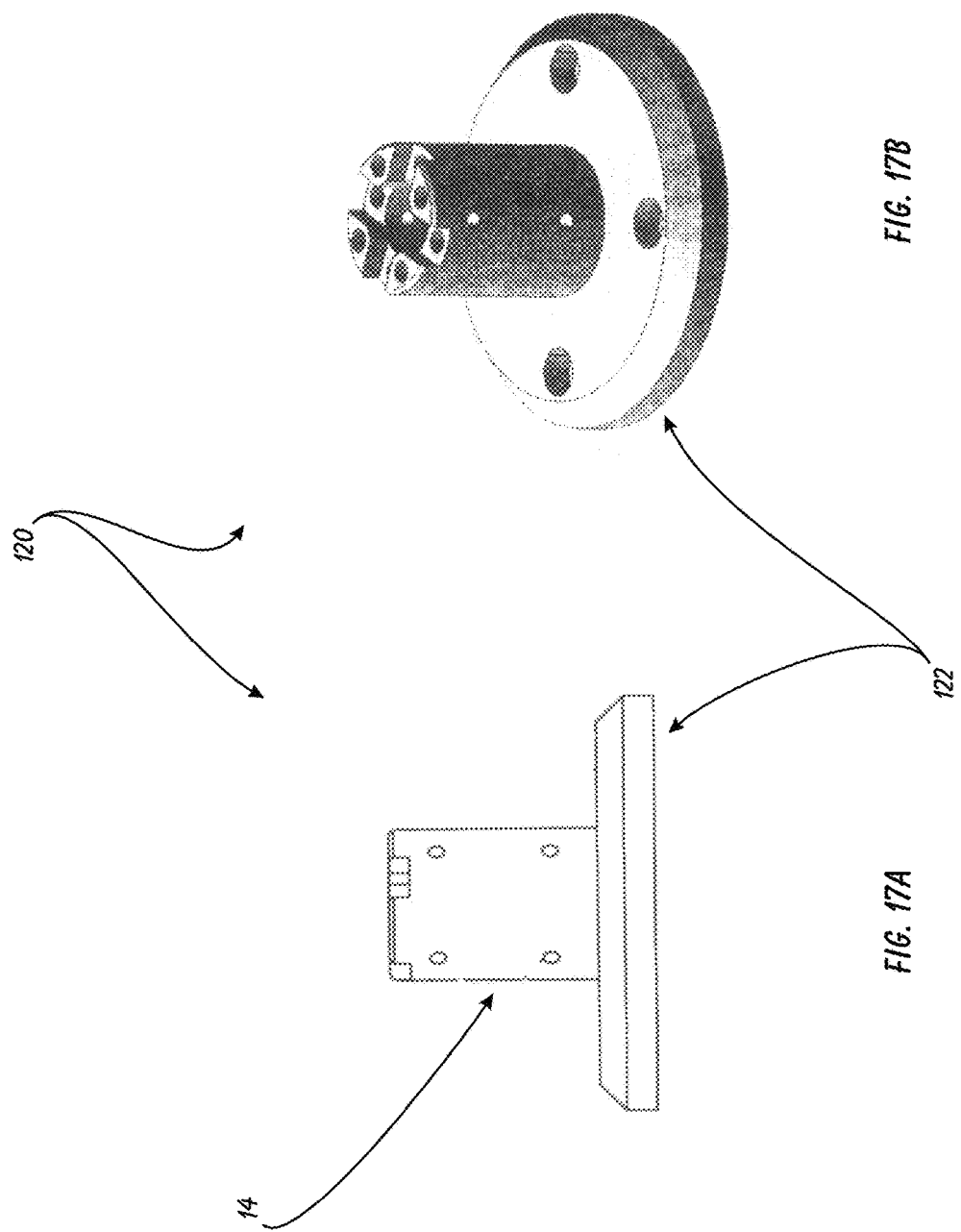

TUBULAR FRAMING SYSTEM AND METHOD

This application is filed within one year of, and claims priority to Provisional Application Ser. No. 62/173,306, filed Jun. 9, 2015.

BACKGROUND OF THE INVENTION

1. Field of the Invention

This invention relates generally to modular structural systems and, more specifically, to a Tubular Framing System and Method.

2. Description of Related Art

As discussed herein, tubular framing systems are components that can be used to create structures by interconnecting tubular members. Steel and aluminum tubular framing systems are well-known, and have been practiced for decades. In recent years, the use of light-weight composite materials has become very popular. Carbon fiber has very desirable strength and weight characteristics that allow it to be substituted for metal components whenever feasibly possible. This has become particularly valuable in the aircraft industry because reducing aircraft weight allows the aircraft to carry more onboard fuel, while also reducing fuel consumption because there is less weight to keep aloft.

Unlike the prior metal tubular structures, however, carbon fiber has serious restrictions. First, carbon fiber tubes cannot be welded to one another in order to create structures. Since the carbon fiber tubing is essentially a high-strength fiberglass, they can only be attached to one another by adhesive or by mechanical connection (or some combination of the two). One problem with adhesive bonded joints is that each glued joint will exhibit an unknown strength, since there are many variables involved in achieving a glued connection. The only way to be sure is to strength test each and every joint once they are glued. This quality assurance testing can only really be done in the facility in which the joint was glued, and not out in the field.

Another problem with the adhesive approach is that the glue and the carbon fiber tubes will expand and contract at different rates in response to temperature fluctuations (which are common in the aviation environment). This difference in temperature sensitivity will ultimately result in a breakdown of the glued joints over time, thereby making these glued joints weak (and therefore unacceptable in many applications).

A final problem with glued joints is that the glue joint is permanent. There is not opportunity to disassemble the glued joints once they are bonded. Any adjustment or modification to the tubular structure is therefore not possible.

To date, a strictly mechanical system for interconnecting carbon fiber tubes (and panels) in order to form structures (e.g. shelf units, storage units, and many others) that exhibit the strength and weight-reducing benefits of the composite materials, while also providing the ability to create, assemble and disassemble the structures "in the field" has not been created.

SUMMARY OF THE INVENTION

In light of the aforementioned problems associated with the prior systems and methods, it is an object of the present invention to provide a Tubular Framing System and Method. The system and method should enable users to create structures from tube stock, such as carbon fiber or other composites without the need for a specialized workspace or customized tooling. The system should allow the user to create joints, attachment points and mounting points for tubular and sheet composite material. When assembled, the joints between tubular segments and the attached termination fittings should provide unparalleled tensile strength without the need for adhesives or special testing for verification. The system should include base assemblies, midspan bracket and mounting assemblies and a wide range of versatile connectors that can provide the user with the flexibility to easily and rapidly create a wide variety of structures from strong and lightweight composite tube stock and aircraft-grade aluminum connectors.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 16 is a perspective view of a shelving assembly constructed using the framing system of the present invention; and FIGS. 17A and 17B are side and perspective views of a preferred embodiment of a foot assembly of the framing system of the present invention.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Tubular Framing System and Method.

The system of the present invention is a collection of fittings, components and fasteners that are intended to be used to fasten segments of tubular material to one another in order to create a wide variety of structures. While the system will work with tubing material of virtually any type, it is intended to be used with composite (e.g. carbon fiber) material because of the substantial weight and strength benefits provided by that particular material. The user is able to fabricate these structures using the system of the present invention without the need for specialty tools or a specialized workspace. It is simply a matter of cutting the tubing into segments of the desired length, cutting a few holes in the walls of the tubing through which fasteners will attach the tubing to the fittings/components/assemblies of the instant system, and then assembling the joints between the tubing segments from a selection of the fittings, components and fasteners of the instant system. We will now proceed through a description of the most common components that make up the system of the present invention.

Figure 1:
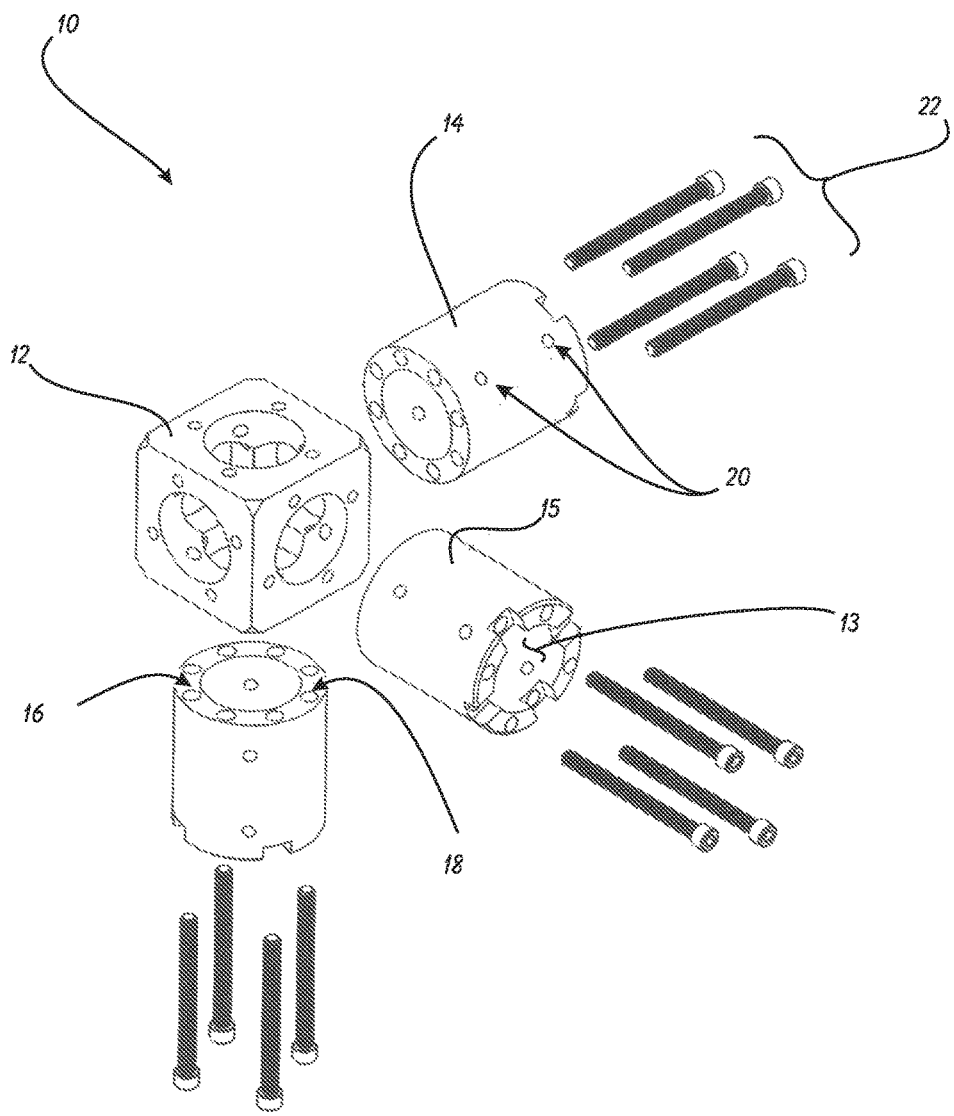
FIG. 1 is an exploded perspective view of a preferred embodiment of an end assembly of the framing system of the present invention.

The present invention can best be understood by initial consideration of FIG. 1.[1] FIG. 1 is an exploded perspective view of a preferred embodiment of an end assembly 10 of the framing system of the present invention. It should be understood that the term "end assembly" is not intended to limit the assembly 10 only for use at the end of a structure. In fact, as will be demonstrated herein below, the wide range of combinations of components of the present system will provide virtually limitless applications and positions for each component and/or assembly.

[1] As used throughout this disclosure, element numbers enclosed in square brackets [ ] indicates that the referenced element is not shown in the instant drawing figure, but rather is displayed elsewhere in another drawing figure.

The basic element of the end assembly 10 is the main block 12. The main block 12, and virtually all of the other components in the system, is made from aircraft grade aluminum (e.g. 6061-T6). The components are typically sized to interface with 1-inch, 1.5-inch or 2-inch (inner diameter) carbon fiber tubing, but other sizes would be available under this system, if desired. Two or more main sleeve adapters 14 are attached to the main block 12 by a plurality of adapter mounting bolts 22. These bolts 22 and the others discussed herein below preferably are extremely strong—on the order of 170,000 pounds per square inch tensile strength.

The main sleeve adapters 14 are selected by diameter so that they will fit snugly within the inner diameter of a segment of tubing. There is a central bore 13 through the adapters 14 along its longitudinal axis, as well as a plurality of tube mounting bores 16 (typically smooth-walled—without threads) running around the periphery of the central bore 13. In this version, there are supplemental bores 18 in between each mounting bore 16. The supplemental bores 18 simply reduce the weight of the sleeves 14 while still providing sufficient rigidity and strength to support the fabrication of structures.

The peripheral face 15 of the sleeves 14 have two or more tube mounting bores 20 formed through them (actually there are typically a pair of bores 20 on opposing sides of the peripheral face 15). These bores 20 are threaded in order to engage tube mounting bolts [26] as depicted in FIG. 2.

Figure 2:
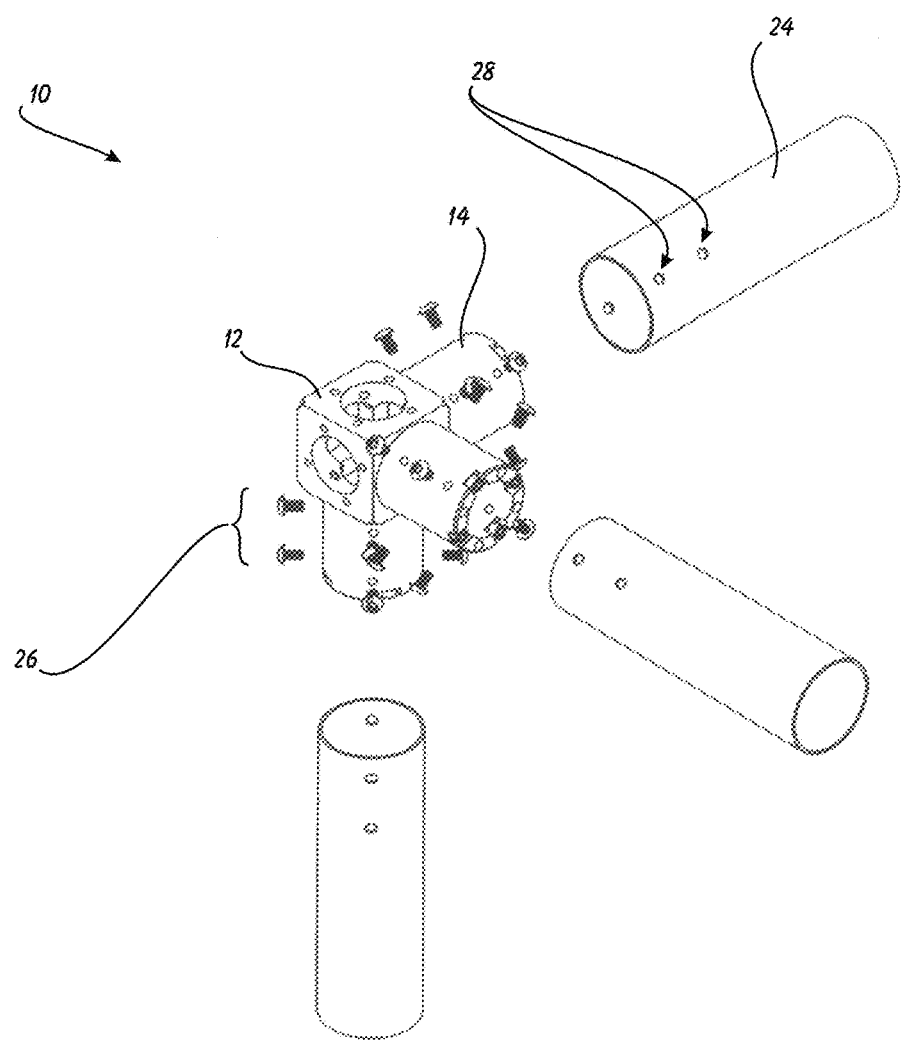
FIG. 2 is a partially exploded perspective view of the end assembly of FIG. 1.

FIG. 2 is a partially exploded perspective view of the end assembly 10 of FIG. 1. In this view, the sleeves 14 have been secured to the main block 12 with the bolts [22]. Once they've been attached, the user need simply slip tube segments 24 of the appropriate diameter and length over each sleeve 14. As shown, tube mounting apertures 28 have been formed through each segment 24. Once the segments 24 are in place, tube mounting bolts 26 are inserted through the apertures 28 so that they threadedly engage the tube mounting bores [20]. The final product is depicted in FIG. 3.

Figure 3:
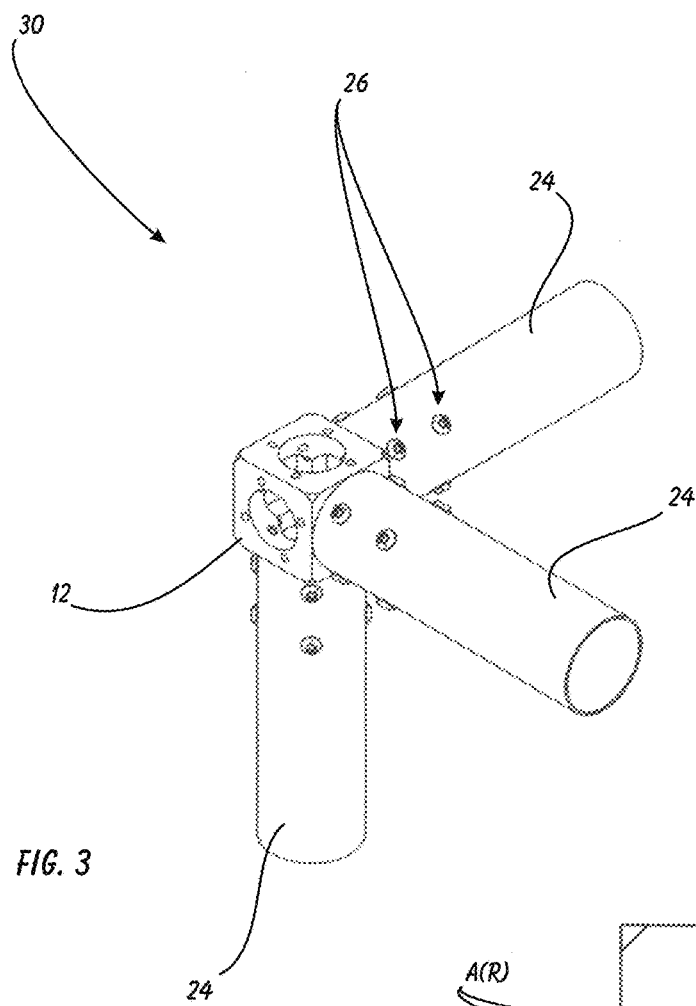
FIG. 3 is a perspective view of the end assembly of FIG. 2.
Figure 4:
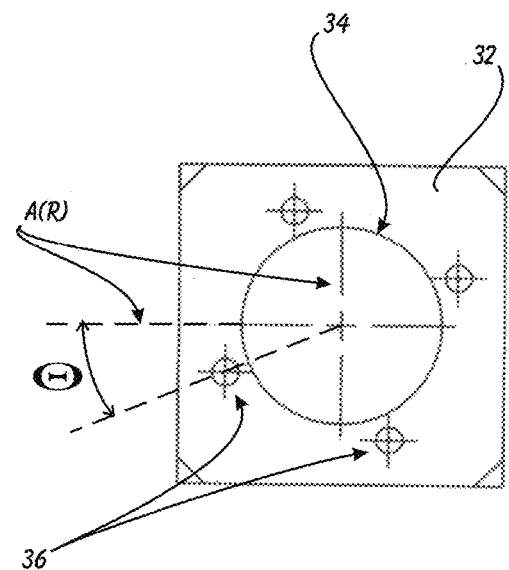
FIG. 4 is a side view of the main block of FIGS. 1-3.

FIG. 3 is a perspective view of the end assembly 10 of FIG. 2. As a completed junction of tube segments 24, this assembly 10 forms a corner element 30 for a structure (e.g. such as a corner of a box). As shown in the side view of the main block 12 of FIG. 4, each face 32 of the block 12 is defined by a central bore 34 and a plurality of adapter mounting bores 36. Each bore 36 is threaded in order to threadedly engage the adapter mounting bolts [22]. One further critical feature is depicted in FIG. 4, which is a side view of the corner element 30. That feature is that the bores 36 are positioned at an angle ($\Theta$) of 22.5 degrees from the reference axes A(r). The purpose of the rotated positioning is to provide room so that the bores 36 can penetrate as far as possible into the main block 12 without impinging on the bores 36 penetrating the other faces 32 of the main block 12.

Figure 5:
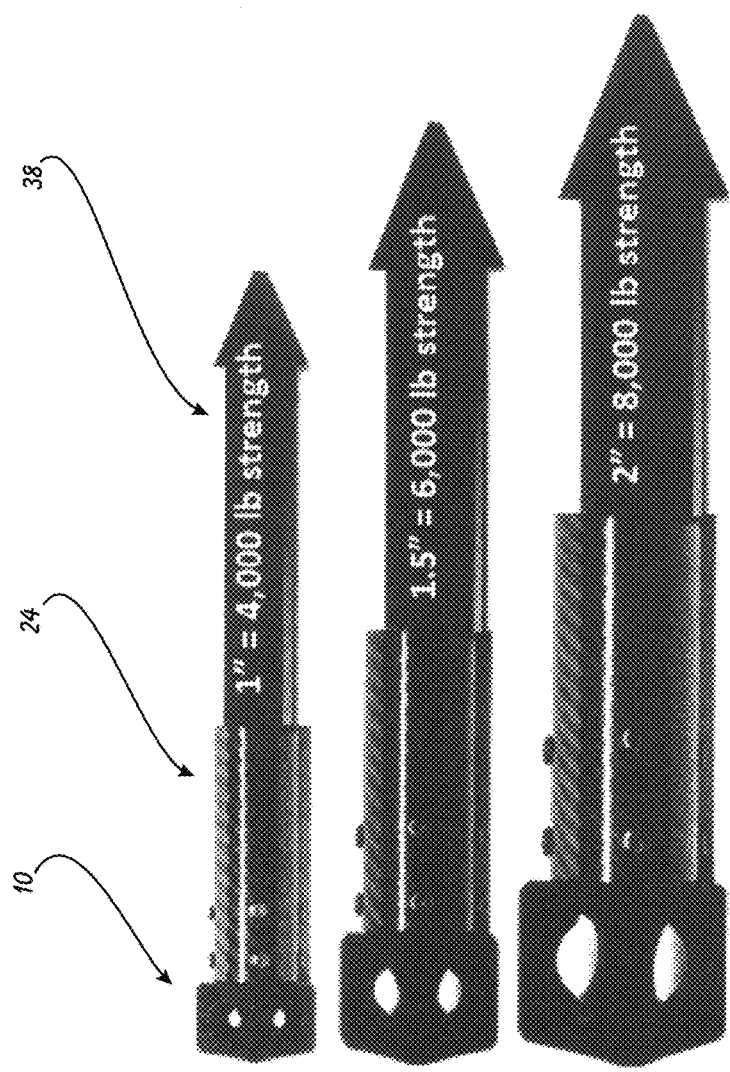
FIG. 5 depicts the strength ratings of the corner assembly of FIGS. 1-3.

FIG. 5 depicts the strength ratings of the end assembly 10 of FIGS. 1-3. Testing has revealed that a 1-inch tube attached to a 1-inch end assembly 10 can sustain at least 4,000 pounds per square inch of tensile force 38 applied to the tube segment 24. A 1.5-inch configuration can sustain at least 6,000 psi, and a 2-inch configuration can sustain at least 8,000 psi. These strengths far exceed those provided by any prior composite tube structure without the need for adhesive or testing. Now turning to FIG. 6, we can commence a review of the other components of the system.

Figure 6:
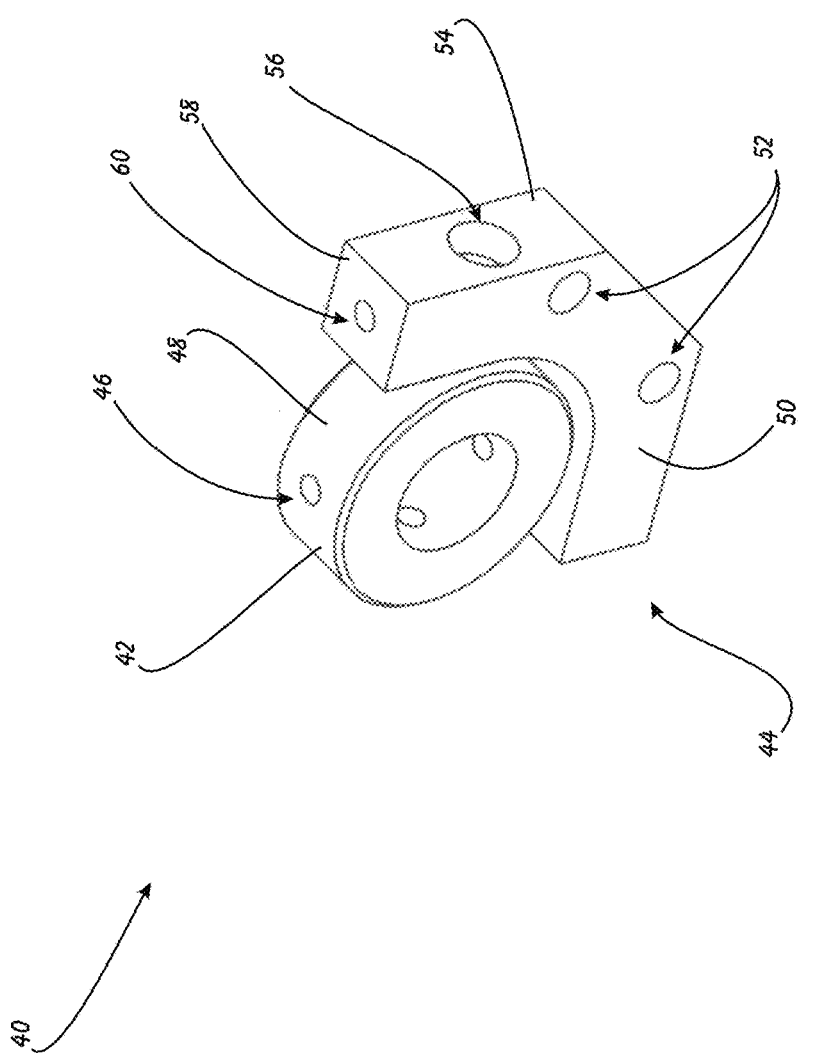
FIG. 6 is a perspective view of a preferred embodiment of a sidewall bracket assembly of the framing system of the present invention.

FIG. 6 is a perspective view of a preferred embodiment of a sidewall bracket assembly 40 of the framing system of the present invention. The two main components of the assembly 40 are the inner base ring 42 and the corner bracket element 44. The inner base ring 42 is selected to fit within the interior bore of a tubing segment [24], and has a plurality of bracket mounting bores 26 (there are 4 here) penetrating the outer face 48 of the ring in spaced relation.

The corner bracket element 44 is named as such because it is not straight, but rather has a pair of "arms" that extend at 90 degrees from one another. The top face 50 of the element 44 has a pair of accessory mounting bores 52 formed through it and through the entire element 44. These bores 52 are typically smooth-walled, and provide an attachment point for other elements in the system. There are panel mounting bores 60 formed through each end face 58 to provide an attachment point for panels (ideally made of carbon fiber). These are preferably threaded in order to accept mounting bolts very similar to the tube mounting points [26] discussed above.

Figure 7:
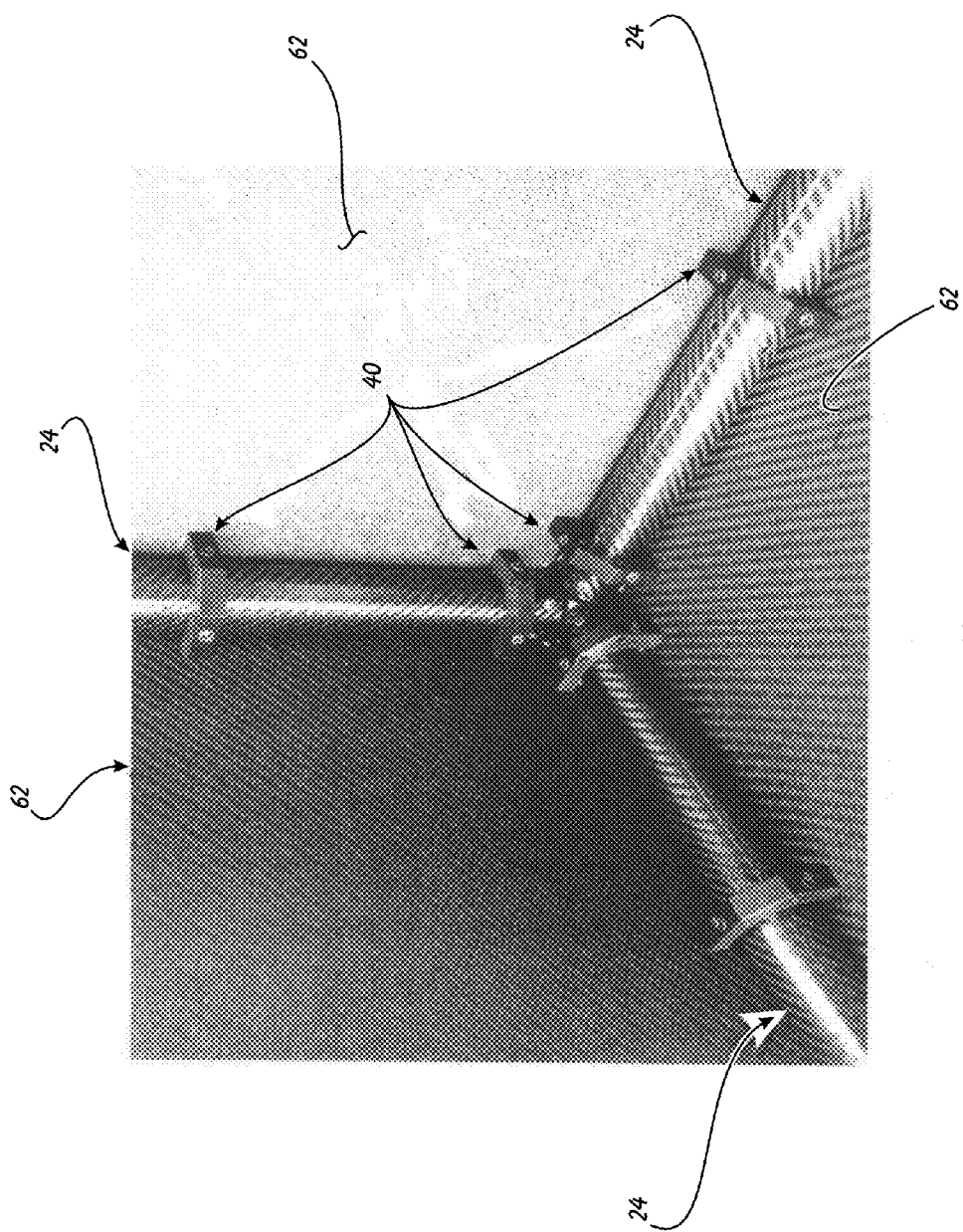
FIG. 7 is a partial perspective view of the sidewall bracket assembly of FIG. 6 employed in the assembly of the corner portion of the box structure.
Figure 8:
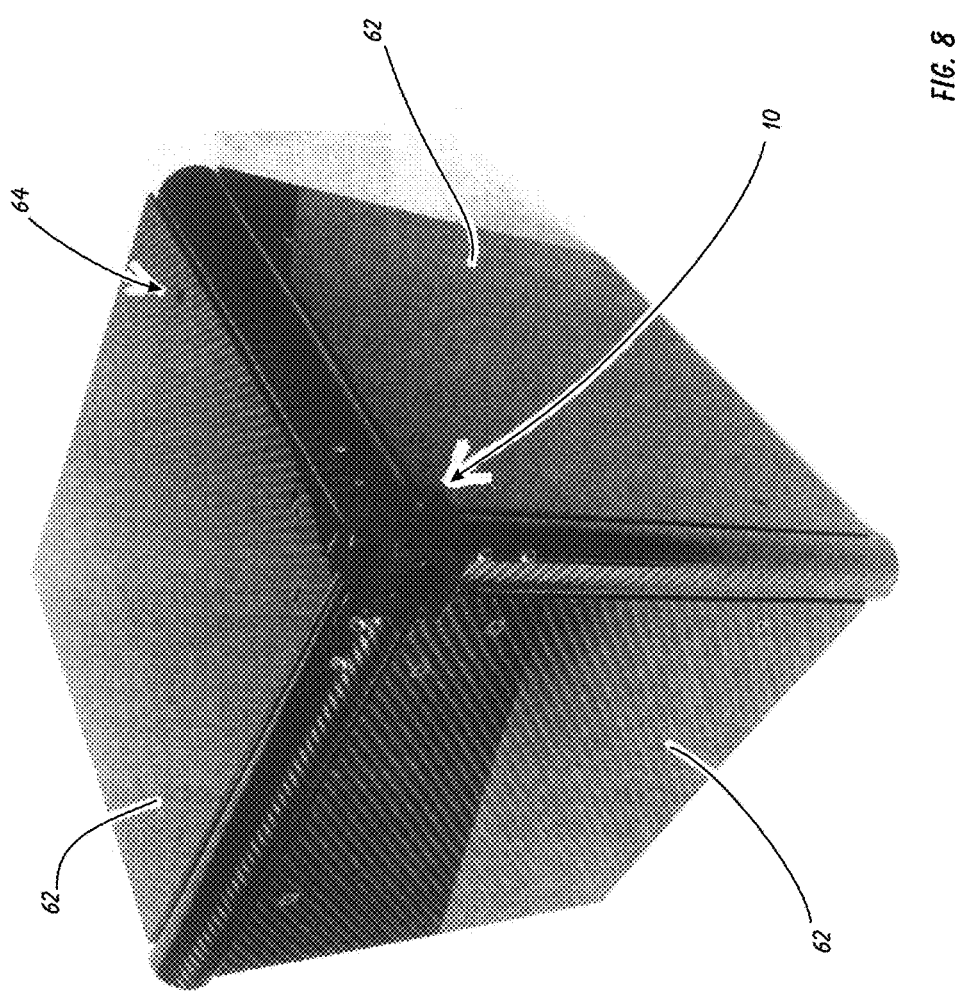
FIG. 8 is a partial perspective view from outside of the box structure of FIG. 7.

The bracket element 44 is attached to the outside of a tube segment by mounting bolts (not shown) passing through mounting bores 56 formed in the side faces 54 of the element 44, then through apertures formed in the tubing segment, and threadedly engaging bracket mounting bores 46 formed in the inner base ring 42. FIGS. 7 and 8 show a box structure that can be created by utilizing the end assembly [10] and the sidewall bracket assemblies 40.

Three tube segments 24 have been interconnected to one another by end assembly 10, so that the tube segments 24 extend at 90 degree angles from one another. Sidewall bracket assemblies 40 are attached to the segments 24 in appropriate locations along the length of the segments 24 such that the end faces [58] face outwardly. Panel members 62 are attached to the panel mounting bores [60] by mounting bolts 64 that pass through apertures formed in the panels 62 for this purpose (presumably by the user/assembler).

Figure 9:
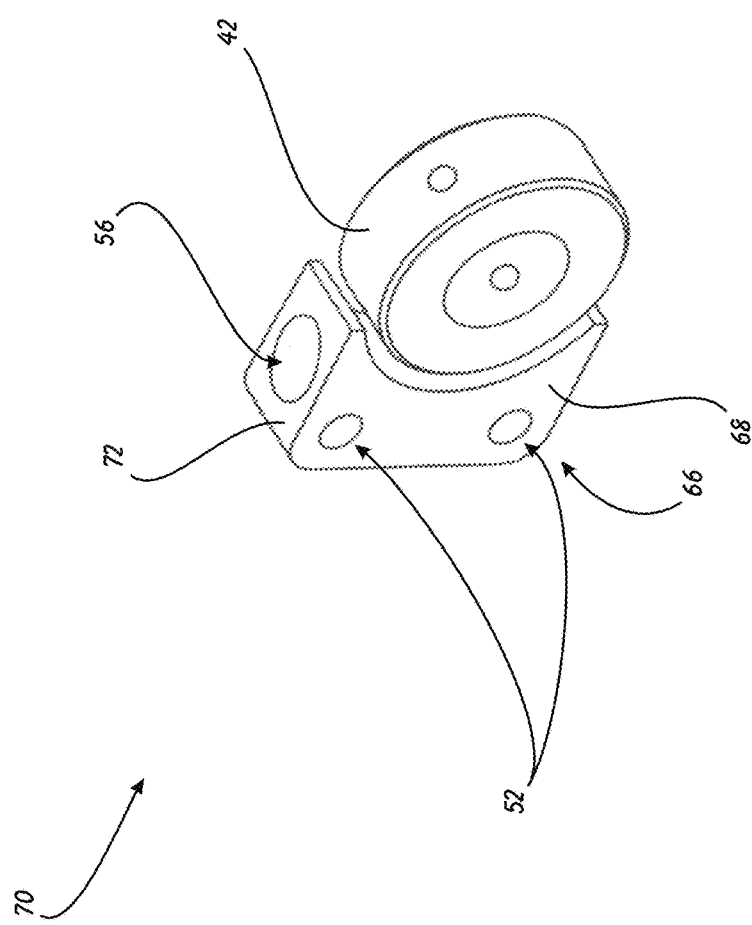
FIG. 9 is a perspective view of a preferred embodiment of a midspan bracket assembly of the framing system of the present invention.

FIG. 9 is a perspective view of a preferred embodiment of a midspan bracket assembly 70 of the framing system of the present invention. As with the sidewall bracket assembly [40], this assembly 70 utilizes the inner base ring 42 that is inserted into the tube segment [24] when assembling the structure.

A straight bracket element 66 bolts onto the outside of the tube segment [24] by mounting bolts [22] (typically shorter in length) that pass through the mounting bores 56 formed in the end face 72 and apertures formed in the tube segment [24] and then threadedly engaging a bracket mounting bore [46].

Figure 13:
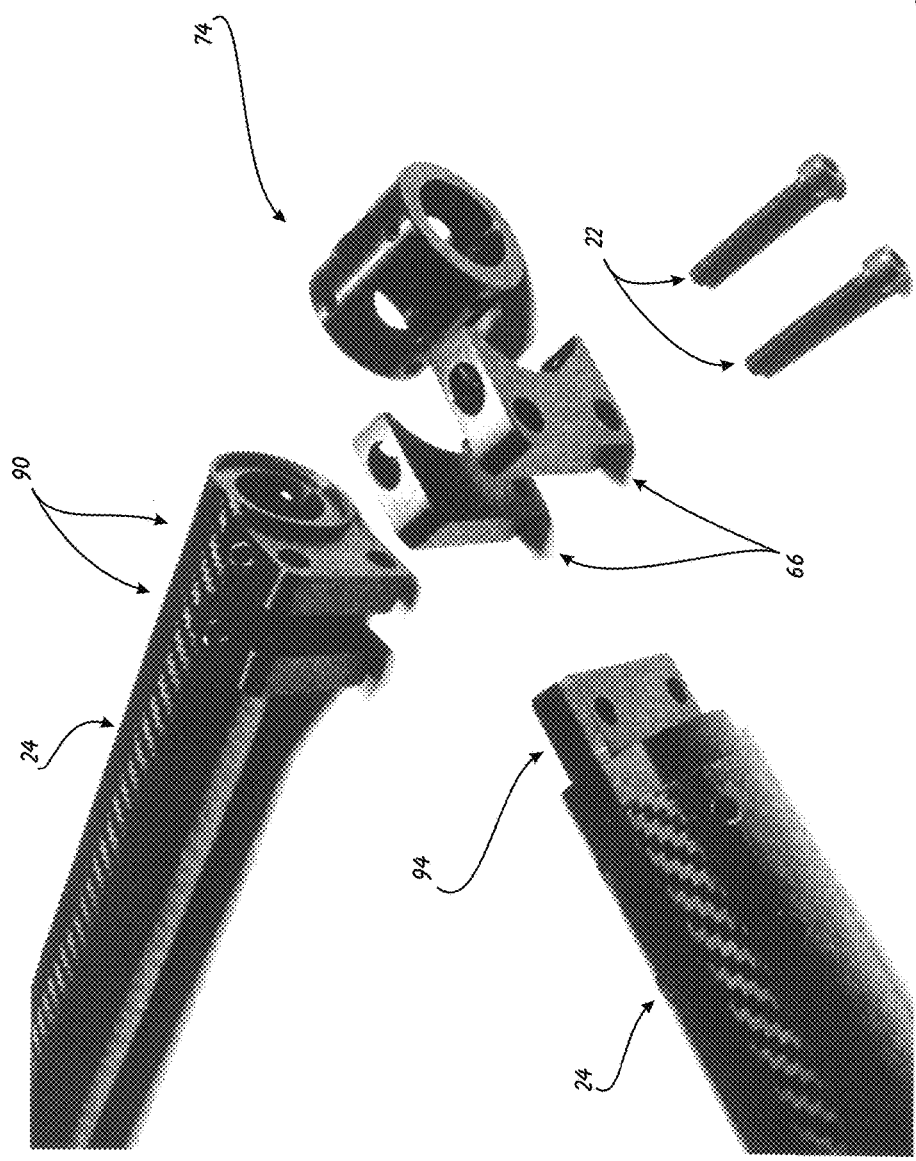
FIG. 13 is a series of perspective views of the components comprising a preferred embodiment of a double midspan bracket assembly of the framing system of the present invention.

The straight bracket assembly 66 has a pair of (typically smooth-walled, unthreaded) accessory mounting bores 52 formed through the top face 68 (through to the bottom face) of the element 66. FIG. 13 depicts one application for this straight bracket element 66.

Figure 10:
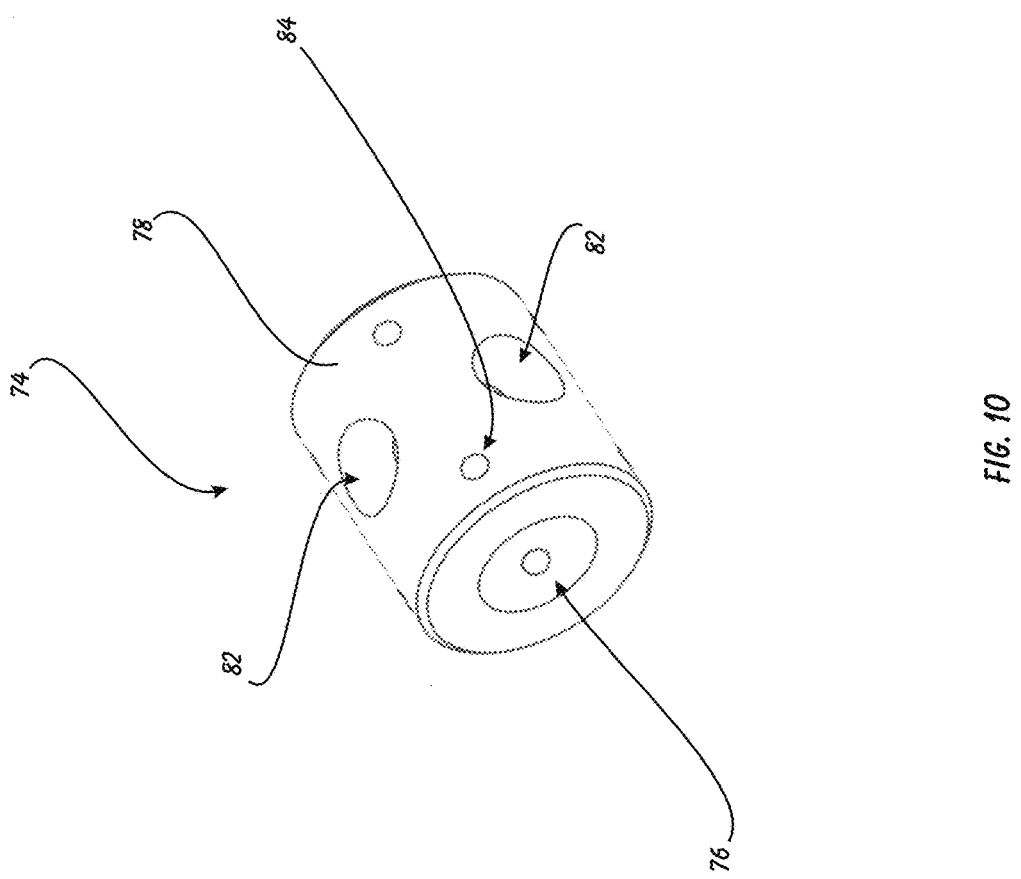
FIG. 10 is a perspective view of a preferred embodiment of an intermediate sleeve adapter of the framing system of the present invention.

FIG. 10 is a perspective view of a preferred embodiment of an intermediate sleeve adapter 74 of the framing system of the present invention. This adapter 74 has a wide variety of potential uses in the system of the present invention. It also inserts into a tube segment [24] in order to provide a base to which exterior elements can be bolted onto the outside of the tube segment [24].

Figure 11:
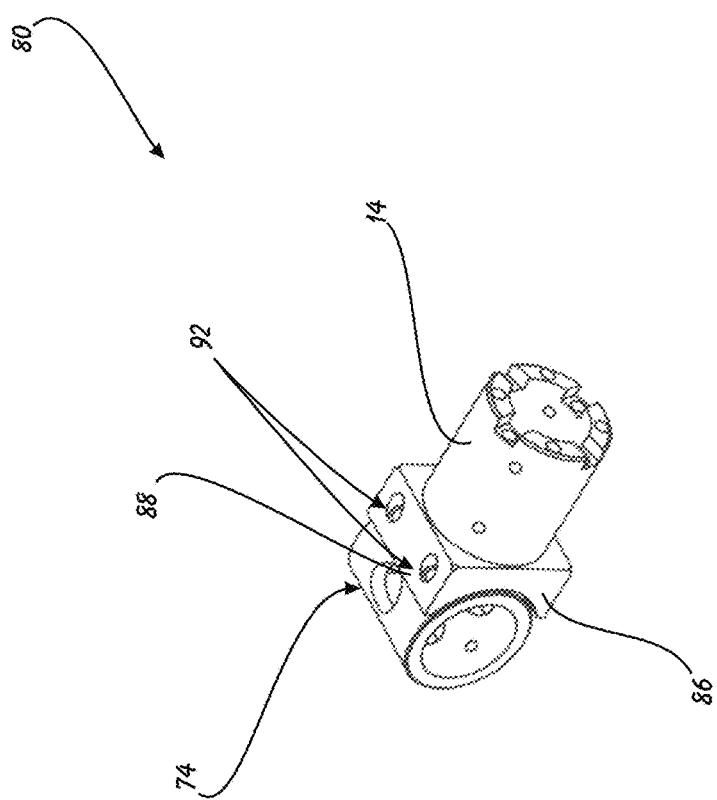
FIG. 11 is a preferred embodiment of a midspan base assembly of the framing system of the present invention.

The sleeve adapter 74 has a longitudinal bore 76 formed along its length (a through-hole). Bracket mounting bores 84 (threaded) are formed in the outer face 78 of the adapter 74. Additionally, there are smooth-walled, somewhat larger transverse bores 82 that cross each other at the midpoint of the adapter 74. FIG. 11 depicts one use for the intermediate sleeve adapter 74.

FIG. 11 is a preferred embodiment of a midspan base assembly 80 of the framing system of the present invention. The intermediate sleeve adapter 74 is positioned within the interior of the tube segment [24]. A midspan base element 86 bolts to the bracket mounting bores [84] formed in the sleeve adapter 74 via base mounting bolts 92. This assembly 80 can be positioned in the middle of a tube segment [24], rather than at its end. A main sleeve adapter 14 can then be attached to it by mounting bolts [22] to provide a midspan attachment point for a second tube segment [24].

Figure 12:
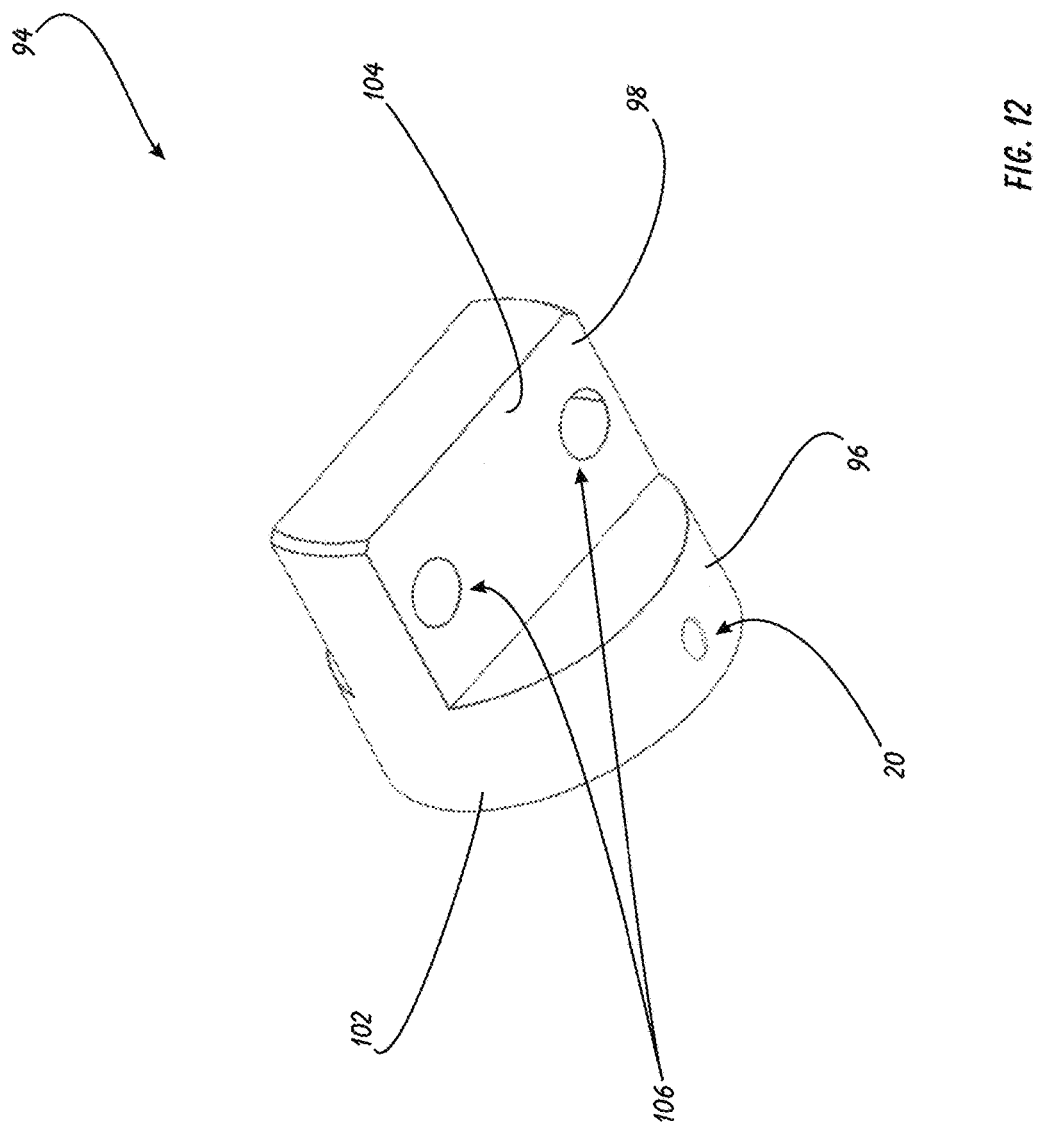
FIG. 12 is a perspective view of a preferred embodiment of an end bracket of the framing system of the present invention.

FIG. 12 is a perspective view of a preferred embodiment of an end bracket 94 of the framing system of the present invention. End brackets 94 are utilized in a wide variety of arrangements with other components in the system. It is designed to provide an attachment point extending from the tip of a tube segment [24]. The inner portion 96 is designed to fit into the mouth at the end of a tube segment, and the tab portion 98 will extend from the end of the tube segment [24]. Tube mounting bores 20 (threaded) are located through the peripheral face 102, in order to accept mounting bolts passing through apertures in the tube segment [24] and engaging the threads within the bores 20. The tab portion 98 has a pair of smooth-walled attachment bores 106 extending between the side faces 104 of the tab portion 98. FIG. 13 depicts how some of these components can be combined to form useful structures.

FIG. 13 is a series of perspective views of the components comprising a preferred embodiment of a double midspan bracket assembly 90 of the framing system of the present invention. As shown, an intermediate sleeve adapter 74 has been inserted into the end of a tube segment 24. A pair of straight bracket elements 66 each attach to a pair of bracket mounting bores [84] provided by the sleeve adapter 74.

The second tube segment 24 has an end bracket 94 attached to it. In this particular arrangement, one of the straight bracket elements 66 (the one on the left) has threads on its accessory mounting bores [52] so that mounting bolts can threadedly attach to them. As should be apparent, the tab portion [98] can be placed between the two straight bracket elements, and then the mounting bolts 22 inserted and tightened down to the (left) straight bracket element 66. This provides a secure attachment between the two tube segments [24], that is also easily disassembled when desired.

Figure 14:
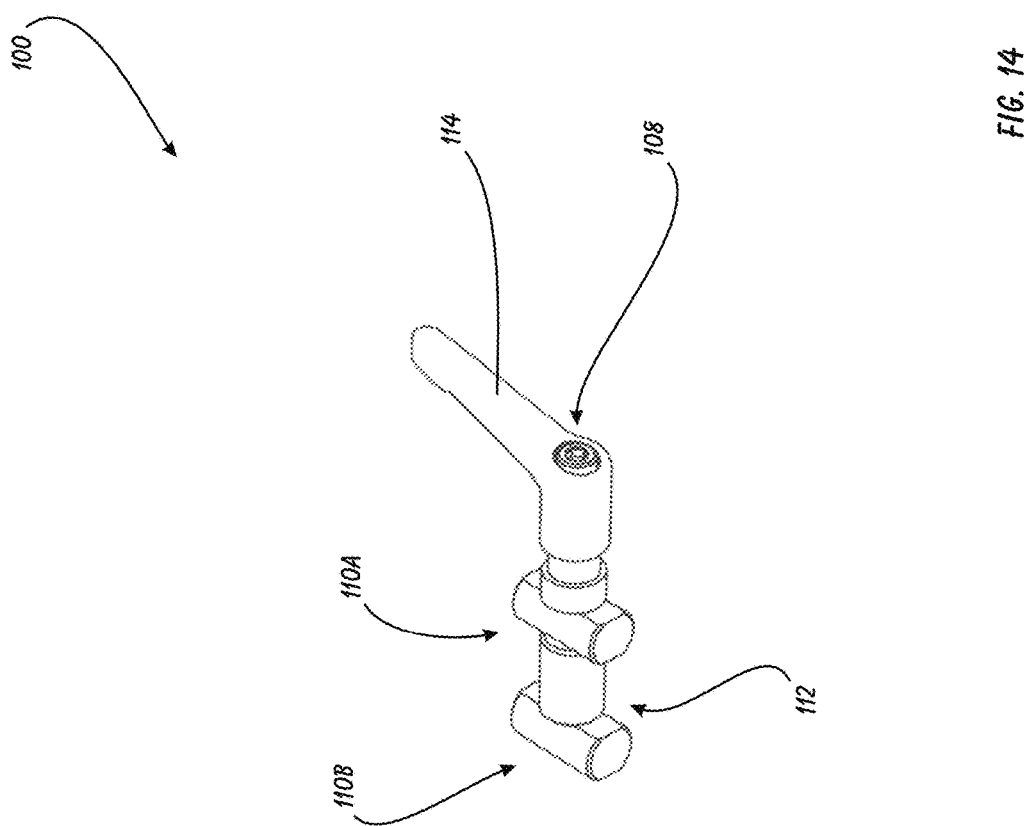
FIG. 14 is a perspective view of a preferred embodiment of an adjustable joint assembly of the framing system of the present invention.

FIG. 14 is a perspective view of a preferred embodiment of an adjustable joint assembly 100 of the framing system of the present invention. This mechanism provides an attachment between two tube segments [24] where the angle between the two tube segments [24] can be adjusted as desired by loosening and tightening the handle 114.

Figure 15:
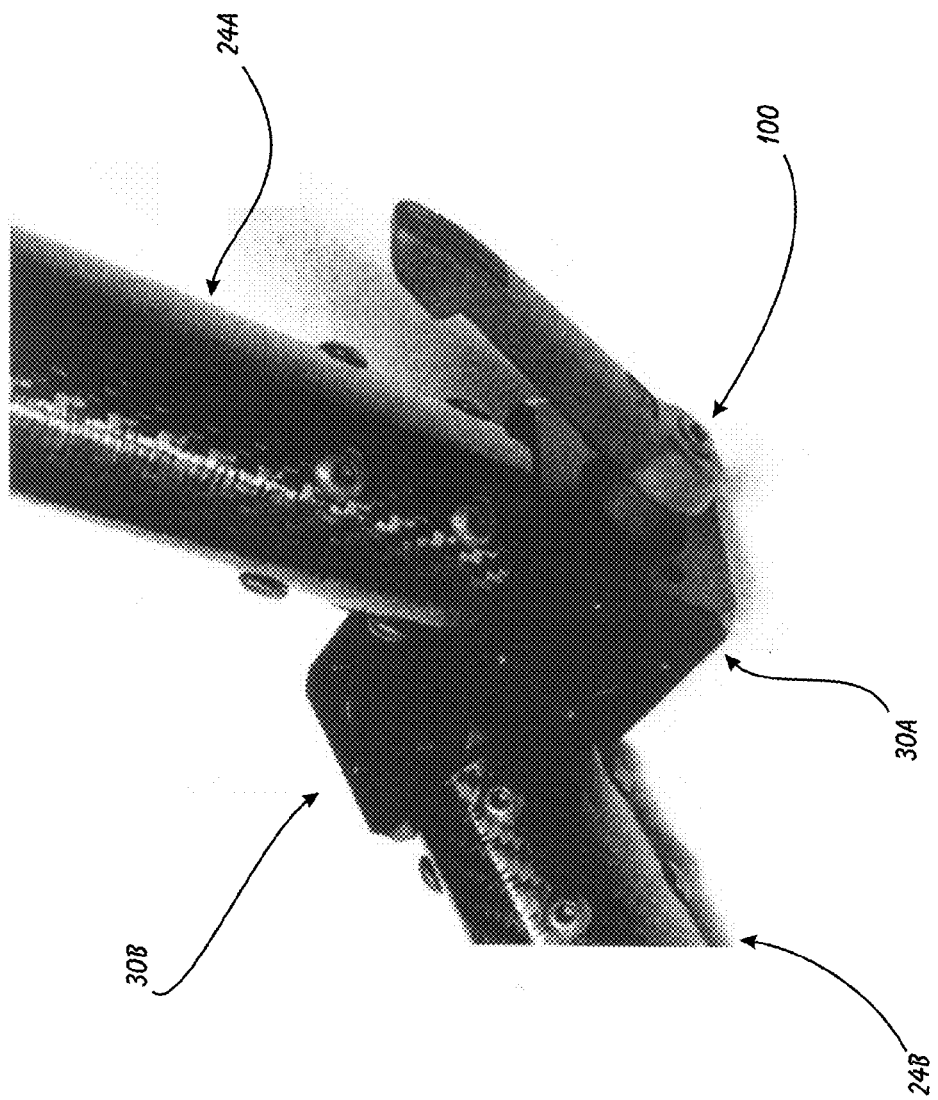
FIG. 15 is a perspective view of the adjustable joint assembly of FIG. 14 employed in the assembly of an adjustable joint of a pair of tube segments.

The assembly 100 comprises an assembly bolt 108 that holds the assembly together. The bolt 108 passes through a first axle element 110A, a spacer element 112, and then threadedly engages a second axle element 110B. Turning the handle 114 will cause the assembly bolt 108 to turn, and thereby either tighten or loosen axle elements 110A, 110B (i.e. the squeezing force against the spacer element 112). When the bolt 108 is loosened, the axles 110A, 110B are free to rotate around the bolt 108 so that their relative angles can be changed (and then the bolt 108 can be re-tightened). FIG. 15 depicts how an adjustable joint can be created utilizing this assembly 100.

FIG. 15 is a perspective view of the adjustable joint assembly 100 of FIG. 14 employed in the assembly of an adjustable joint of a pair of tube segments 24. Here, one axle element 110A has been placed within the central bore [34] of the main block of a first corner element 30A, and the threaded axle element 110B has been placed within the central bore [34] of the main block of a second corner element 30B. The spacer element [112] has been placed between the two corner elements 30A, 30B, and then the bolt [108] and handle [114] have been inserted through the first axle element [110A], the spacer element [112], and then threads into the second axle element [110B]. Once assembled, the user need simply place the tube segments 24A, 24B in the desired relative angles, and then turn the handle [114] to tighten the joint to hold the angular orientation of the tube segments 24A, 24B.

FIG. 16 is a perspective view of a shelving assembly 116 constructed using the framing system of the present invention. A plurality of corner elements 30 and mid-span base assemblies 80 have been utilized to create a lightweight, strong storage unit.

FIGS. 17A and 17B are side and perspective views of a preferred embodiment of a foot assembly 120 of the framing system of the present invention. The assembly 120 is constructed by bolting a main sleeve adapter 14 to a foot element 122. As should be apparent, this provides a stable base to form "feet" for structures created using the system of the present invention.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A structural assembly, comprising: a first hollow tubular segment defined by a proximal end and a distal end;
    a second hollow tubular segment; and
    an end assembly interconnecting said first and second hollow tubular segments, said end assembly comprising:
    a first sleeve adapter inserted into a hollow interior of said first hollow tubular segment at said proximal end and detachably attached thereto;
    a second sleeve adapter inserted into a hollow interior of said second hollow tubular segment and detachably attached thereto;
    a block element defined by a plurality of adapter mounting bores formed therein, wherein said block element comprises:
    a rectangular block-shaped base defined by six faces arranged in three sets of pairs of parallel faces;
    a central bore formed through each of said six faces and interconnecting two said faces forming each of said three pairs of parallel faces, said central bore defining a center, a central bore vertical axis and a central bore horizontal axis;
    adapter mounting bores formed through each of said six faces and defining a mounting bore pattern further defining a mounting bore pattern vertical axis and a mounting bore pattern horizontal axis, whereby said mounting bore pattern vertical axis is rotationally offset from said central bore vertical axis and said mounting bore pattern horizontal axis is offset from said central bore horizontal axis by an angle theta, wherein said angle theta is less than forty five degrees; and a plurality of mounting bolts interconnecting said first and second sleeve adapters to said block element by passing through longitudinal bores formed in said sleeve adapters and threadedly engaging said adapter mounting bores.

2. The structural assembly of claim 1, further comprising:
    a second said end assembly connecting to said distal end of said first hollow tubular segment, said second end assembly comprising:
    a third sleeve adapter inserted into a hollow interior of said first hollow tubular segment and detachably attached thereto;
    a block element defined by a plurality of adapter mounting bores formed therein, wherein said block element comprises:
    a rectangular block-shaped base defined by six faces arranged in three sets of pairs of parallel faces;
    a central bore formed through each of said six faces and interconnecting two said faces forming each of said three pairs of parallel faces, said central bore defining a center, a central bore vertical axis and a central bore horizontal axis;
    adapter mounting bores formed through each of said six faces and defining a mounting bore pattern further defining a mounting bore pattern vertical axis and a mounting bore pattern horizontal axis, whereby said mounting bore pattern vertical axis is rotationally offset from said central bore vertical axis and said mounting bore pattern horizontal axis is offset from said central bore horizontal axis by an angle theta, wherein said angle theta is less than forty five degrees; and
    a plurality of mounting bolts interconnecting said third sleeve adapter to said block element by passing through longitudinal bores formed in said sleeve adapter and threadedly engaging said adapter mounting bores.

3. The structural assembly of claim 1, comprising:
    a sidewall bracket assembly attached to one of said first or second hollow tubular segments, said sidewall bracket assembly, comprising:
    an inner base ring defined by a peripheral outer face having bracket mounting bores formed therethrough inserted into the hollow interior of said one of said first or second tubular segments whereby said outer face is in contact with a wall of said one of said first or second tubular segments; and
    a corner bracket element attached to an outer surface of said one of said first or second tubular segments by a plurality of mounting bolts passing through apertures formed in said corner bracket element and said one of said first or second hollow tubular segments and threadedly engaging said bracket mounting bores.

4. The structural assembly of claim 3, comprising a flat panel attached to said corner bracket element by at least one panel mounting bolt threadedly engaging a threaded bore formed in said corner bracket element after passing through an aperture formed in said flat panel.

5. The structural assembly of claim 1, comprising:
    a midspan bracket assembly attached to one of said first or second hollow tubular segments, said midspan bracket assembly, comprising:
    an inner base ring defined by a peripheral outer face having bracket mounting bores formed therethrough inserted into said hollow interior of said one of said first or second tubular segments whereby said outer face is in contact with a wall of said one of said first or second tubular segments; and
    a straight bracket element attached to an outer surface of said one of said first or second tubular segments by a plurality of mounting bolts passing through apertures formed in said straight bracket element and said one of said first or second tubular segments and threadedly engaging said bracket mounting bores.

6. The structural assembly of claim 1, comprising:
    a midspan base assembly attached to one of said first or second hollow tubular segments, said midspan base assembly, comprising:
    an intermediate sleeve adapter defined by a peripheral outer face having bracket mounting bores formed therethrough inserted into the hollow interior of said one of said first or second tubular segments whereby said outer face is in contact with a wall of said one of said first or second tubular segments; and
    a midspan base element attached to an outer surface of said one of said first or second tubular segments by a plurality of mounting bolts passing through apertures formed in said midspan base element and said one of said first or second tubular segments and threadedly engaging said bracket mounting bores.

7. The structural assembly of claim 6, comprising a third sleeve adapter attached to said midspan base element by mounting bolts passing through bores formed in said third sleeve adapter and threadedly engaging bores formed in said midspan base element.

8. The structural assembly of claim 1, comprising:
an end bracket attached to one end of one of said first or second hollow tubular segments opposing said first or second sleeve adapter, said end bracket defined by a cylindrical inner portion from which a tab portion extends, said end bracket attached to said one of said first or second tubular segments such that said cylindrical inner portion is located within said one of said first or second tubular segments and said tab portion extends out through the end thereof.

9. The structural assembly of claim 1, comprising:
a double midspan bracket assembly attached to one of said first or second hollow tubular segments, said double midspan bracket assembly, comprising:
an intermediate sleeve adapter defined by a peripheral outer face having bracket mounting bores formed therethrough inserted into the hollow interior of said one of said first or second tubular segments whereby said outer face is in contact with a wall of said one of said first or second tubular segments; and
a pair of straight bracket elements attached to an outer surface of said one of said first or second tubular segments by a plurality of mounting bolts passing through apertures formed in said straight bracket elements and said one of said first or second tubular segments and threadedly engaging said bracket mounting bores.

10. The structural assembly of claim 1, further comprising:
a third sleeve adapter attached to one of said first or second hollow tubular segments at an end opposite said end assembly;
a first corner element attached to said third sleeve adapter; and
a second corner element attached to said first corner element by
an adjustable joint assembly interconnecting said first and second corner assemblies to one another to allow adjustable angular rotation therebetween, said adjustable joint assembly comprising:
a first axle element inserted within said first corner element;
a second axle element inserted within said second corner element;
a spacer element inserted between said first and second corner elements; and
an assembly bolt interconnecting said first axle element, said spacer element and said second axle element.

11. The structural assembly of claim 1, further comprising:
a foot base assembly attached to one of said first or second hollow tubular segments, said foot base assembly, comprising:
a third sleeve adapter defined by a peripheral outer face having bracket mounting bores formed therethrough inserted into the hollow interior of said one of said first or second hollow tubular segments whereby said peripheral outer face is in contact with a wall of said one of said first or second hollow tubular segments;
a plurality of tube mounting bolts interconnecting said one of said first or second hollow tubular segments to said third sleeve adapter; and a foot element attached to said third sleeve adapter by a plurality of said mounting bolts passing through said foot element and threadedly engaging said third sleeve adapter.

12. The structural assembly of claim 1, wherein said angle theta is 22.5 degrees.

13. A structural assembly, comprising:
a first hollow tubular segment;
a second hollow tubular segment; and
an end assembly interconnecting said first and second hollow tubular segments, said end assembly comprising:
a first sleeve adapter inserted into a hollow interior of said first hollow tubular segment and detachably attached thereto;
a second sleeve adapter inserted into a hollow interior of said second hollow tubular segment and detachably attached thereto;
a block element defined by a plurality of adapter mounting bores formed therein;
a plurality of mounting bolts interconnecting said first and second sleeve adapters to said block element by passing through longitudinal bores formed in said sleeve adapters and threadedly engaging said adapter mounting bores;
a third sleeve adapter attached to one of said first or second hollow tubular segments at an end opposite said end assembly;
a first corner element attached to said third sleeve adapter; and
a second corner element attached to said first corner element by
an adjustable joint assembly interconnecting said first and second corner assemblies to one another to allow adjustable angular rotation therebetween, said adjustable joint assembly comprising: a first axle element inserted within said first corner element; a second axle element inserted within said second corner element; a spacer element inserted between said first and second corner elements; and an assembly bolt interconnecting said first axle element, said spacer element and said second axle element.

14. A structural assembly, comprising:
a first hollow tubular segment;
a second hollow tubular segment; and
an end assembly interconnecting said first and second hollow tubular segments, said end assembly comprising:
a first sleeve adapter inserted into a hollow interior of said first hollow tubular segment and detachably attached thereto;
a second sleeve adapter inserted into a hollow interior of said second hollow tubular segment and detachably attached thereto;
a block element defined by a plurality of adapter mounting bores formed therein, wherein said block element comprises:
a rectangular block-shaped base defined by six faces arranged in three sets of pairs of parallel faces;
a central bore formed through each of said six faces and interconnecting two said parallel faces forming each pair of said three sets of pairs of parallel faces, said central bore defining a center, a central bore vertical axis and a central bore horizontal axis;
adapter mounting bores formed through at least two of said six faces and defining a mounting bore pattern further defining a mounting bore pattern vertical axis and a mounting bore pattern horizontal axis, whereby said mounting bore pattern vertical axis is rotationally offset from said central bore vertical axis and said mounting bore pattern horizontal axis is offset from said central bore horizontal axis by an angle theta, wherein said angle theta is less than forty five degrees; and a plurality of mounting bolts interconnecting said first and second sleeve adapters to said block element by passing through longitudinal bores formed in said sleeve adapters and threadedly engaging said adapter mounting bores.

\* \* \* \* \*